July 24, 1962
G. W. McCARTY ETAL
ANTI-SPLINTERING RESILIENTLY-RETAINED
INSERT FOR SHOE OF JIG SAW
3,045,725
Filed Aug. 15, 1961
2 Sheets-Sheet 1
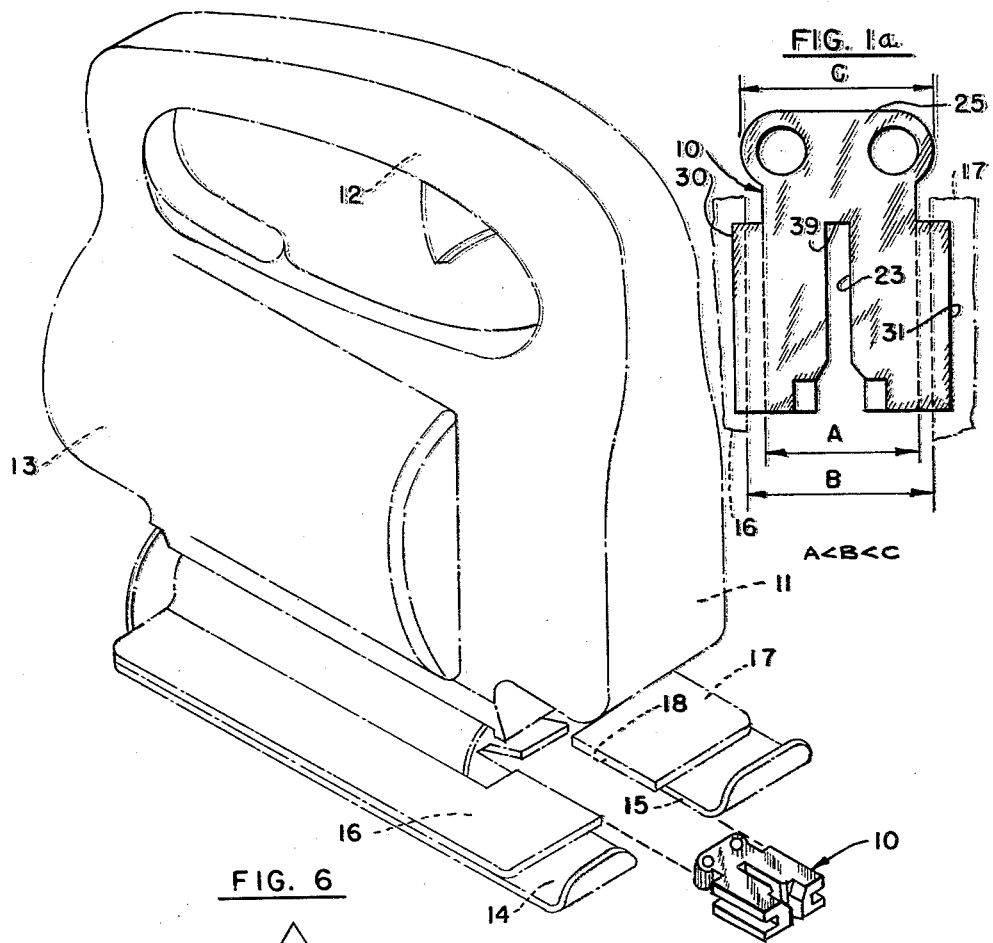
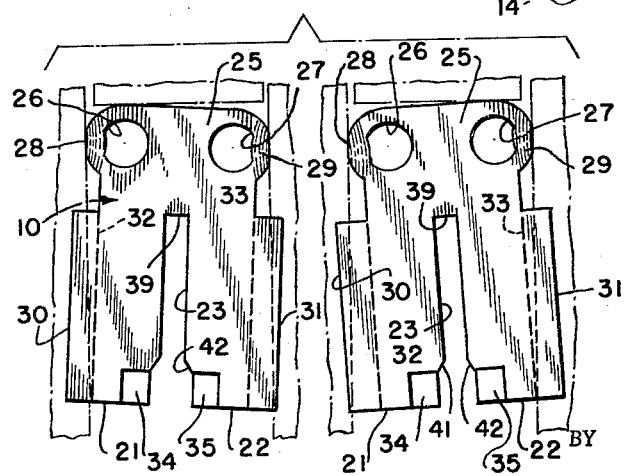
INVENTORS
GEORGE W. McCARTY
ALLEN C. STANLEY
BY Leonard Bloom
ATTORNEY July 24, 1962

G. W. McCARTY ETAL
ANTI-SPLINTERING RESILIENTLY-RETAINED
INSERT FOR SHOE OF JIG SAW 3,045,725

Filed Aug. 15, 1961

INVENTORS
GEORGE W. McCARTY
ALLEN C. STANLEY

BY Leonard Bloom

ATTORNEY

United States Patent Office 3,045,725
Patented July 24, 1962

3,045,725
ANTI-SPLINTERING RESILIENTLY-RETAINED
INSERT FOR SHOE OF JIG SAW
George W. McCarty, Towson, and Allen C. Stanley, Baltimore, Md., assignors to The Black and Decker Manufacturing Company, Towson, Md., a corporation of Maryland
Filed Aug. 15, 1961, Ser. No. 131,623
1 Claim. (Cl. 143—68)

The present invention relates to an anti-splintering resiliently-retained molded insert for the shoe of a jig saw, and more particularly, to such an insert which is an improvement upon the anti-splintering molded insert described in the co-pending McCarty application S.N. 51,965, filed August 25, 1960, assigned to the same assignee as that of the present invention, and issued on August 15, 1961, as U.S. Patent 2,996,089.

In this latter referenced application, the anti-splintering insert described therein is adapted to have a slight lateral play in the plane of the blade opening in the shoe of the jig saw, being restrained against movement vertically of the shoe by means of slotted guideways cooperating with ears on the shoe; and like other anti-splintering inserts of the prior art, such an insert is loosely disposed in the shoe of the jig saw and is not retained therein against endwise movement out of the shoe. Ordinarily, of course, the reciprocating blade of the jig saw, which reciprocates perpendicularly of the shoe and within a guide slot in the insert, precludes an appreciable endwise movement of the insert during the operation of the saw; but when the blade is removed from the saw, as when changing blades for cutting different materials, there is nothing to preclude endwise movement of the insert out of the shoe. Hence, whenever the blade is removed, the prior art inserts habitually fall out of the shoe of the jig saw and are occasionally lost or misplaced; and besides, the continuous loose lateral play of the insert, sometimes referred to as "free floating," tends to create an undesirable or annoying impression in the eyes of the user.

Accordingly, it is an object of the present invention to provide a resiliently-retained insert that alleviates the difficulties associated with prior art anti-splintering inserts of the "free floating" type.

It is another object of the present invention to provide an anti-splintering resiliently-retained insert that has a limited pivoting movement in the plane of the insert.

It is still another object of the present invention to provide an anti-splintering resiliently-retained insert whose lateral width measured across the integral bridge portion of the insert is greater than the width of the rectangular blade opening in the shoe, and whose integral bridge has material removed from a portion thereof, thus allowing the bridge of the insert to have an interference fit within the shoe and to be frictionally gripped therein, and thus allowing the bridge of the insert to be slightly distorted so that the insert is resiliently retained within the shoe.

It is yet still another object of the present invention to provide an anti-splintering resiliently-retained insert that may be integrally molded easily and economically.

These and other objects of the present invention will become apparent from a reading of the following specification, taken in conjunction with the enclosed drawings, in which:

FIGURE 1 is a perspective view of the complete resiliently-retained anti-splintering insert, showing the insert in exploded relationship to a conventional portable electric jig saw, the latter being illustrated in broken lines for ease of illustration;

FIGURE 1a is a top plan view of the insert;

FIGURE 6 is a top plan view of the insert as resiliently-retained within the shoe of the jig saw, showing in alternate positions the limited pivoting movement of the insert.

Figure 2:
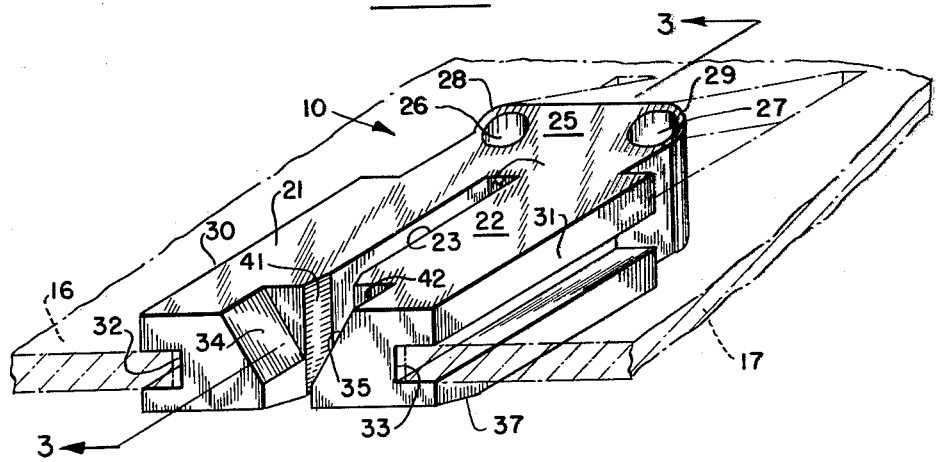
FIGURE 2 is an enlarged perspective view of the insert, showing the cooperating ears of the shoe of the jig saw in broken lines.

With reference to FIGURE 1, there is illustrated the anti-splintering resiliently-retained molded insert 10 in exploded relationship to a conventional portable electric jig saw 11, the latter having a switch handle 12, motor housing 13, and a work-engaging shoe structure including a flat base plate 14. The base plate 14 has an opening 15 therein, and a pair of raised ears 16 and 17 are secured (as by spot welding) on top of the base plate 14, one on each side of the opening 15. Each of the ears 16 and 17 project inwardly to partially overlap the opening 15, and the ears 16 and 17 have a rectangular blade opening 18 therebetween.

Figure 3:
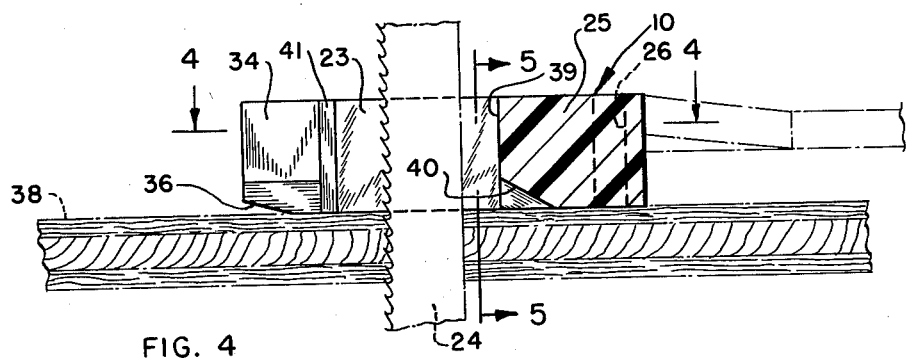
FIGURE 3 is a view taken along the lines 3—3 of FIGURE 2, showing the reciprocating blade within the blade slot of the insert.
Figure 4:
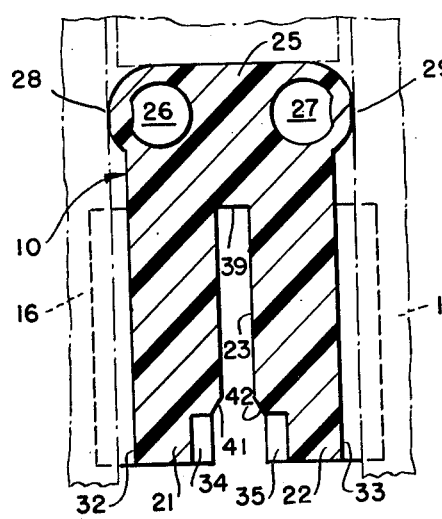
FIGURE 4 is a view taken along the lines 4—4 of FIGURE 3, showing the slight distortion experienced by the integral bridge portion of the resiliently-retained insert, when the insert is disposed within the shoe.
Figure 5:
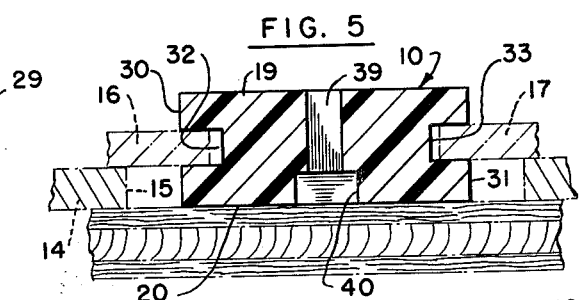
FIGURE 5 is a view taken along the lines 5—5 of FIGURE 3.

With reference to FIGURES 1a, 2, 3, 4 and 5, the insert 10 comprises a single molded body of suitable material, such as a polyurethane sold under the trademark "Tecsin," and the insert 10 has a flat top surface 19 and a flat undersurface 20 which, as shown in FIGURE 5, is substantially co-planar with the undersurface of the flat base plate 14. The insert 10 further comprises a pair of spaced parallel runners 21 and 22 having a central blind slot 23 therebetween for the passage of the reciprocating blade 24 therethrough. An integral bridge 25 joins the runners 21 and 22 rearwardly of the blade slot 23, and the bridge 25 has a portion of its material removed (part of the mold) for reasons hereinafter to be described in detail. This removed portion of the bridge 25 comprises a pair of holes 26 and 27, and the bridge 25 has outer side edges, each of which includes a convex arcuately-shaped portion 28, 29, respectively, protruding therefrom and formed substantially concentric with a respective one of the pair of holes 26 and 27. Each of the runners 21 and 22 has an outer edge 30 and 31, respectively, which are provided with respective slotted guideways 32 and 33; and the edges 30 and 31 (and slotted guideways 32 and 33) are parallel to each other.

With reference, again, to FIGURE 1a, the lateral width A measured across the runners 21 and 22 of the insert 10 (and between the slotted guideways 32 and 33), is slightly less than the width B of the rectangular blade opening 18 between the ears 16 and 17 of the shoe structure; while the width B of the rectangular blade opening 18 is in turn slightly less than the outermost lateral width C measured across the bridge 25 of the insert 10.

Consequently, the insert 10 may be disposed within the shoe of the jig saw 11 such that a slight interference fit is created between the bridge 25 and the ears 16 and 17, that is, the ears 16 and 17 will frictionally engage the bridge 25 of the insert 10; and as illustrated more particularly in FIGURE 4, the bridge 25 (due to the holes 26 and 27) may be slightly distorted so as to exhibit a spring-like effect, thus resiliently retaining the insert 10 within the shoe of the jig saw 11. It will be appreciated, of course, that the spring-like effect of the bridge 25, while sufficient to retain the insert within the shoe of the jig saw 11 against endwise movement out of the ears 16 and 17, is nevertheless insufficient to preclude an easy manual installation (or removal) of the insert 10 with respect to the shoe of the jig saw 11.

Moreover, the ears 16 and 17 will be received within the slotted guideways 32 and 33, respectively, of the insert 10, as shown in FIGURES 2 and 5.

With reference to FIGURE 6, it will be appreciated that the insert 10 may have a slight or limited pivoting movement between the ears 16 and 17, so as to compensate for production misalignments of the blade 24 with respect to the ears 16 and 17, or else to compensate for an appreciable sideways movement of the blade 24, particularly on scroll cutting.

With reference, again, to FIGURES 2, 3 and 4, the runners 21 and 22 have respective forwardmost portions 34 and 35 beveled inwardlly adjacent the blade slot 23, thus allowing for the usual chip-disposing air stream to be passed adjacent to the cutting teeth of the reciprocating blade 24, and also allowing for more visibility to the operator. Moreover, each of the runners 21 and 22 have respective forwardmost toes 36 and 37, which are beveled on their undersurface, thus assuring that the insert 10 will easily glide along the work surface 38, as shown in FIGURE 3. Also, the runners 21 and 22 have respective beveled portions 41 and 42 at the mouth of the blade slot 23, so as to allow the blade 24 to be more easily disposed within the slot 23 of the insert 10. Furthermore, as best illustrated in FIGURES 3 and 5, the blade slot 23 terminates in a rearmost wall 39, which includes a portion 40 beveled rearwardly and downwardly towards the flat undersurface 20 of the insert 10, thus smoothing down any burrs formed coincident with the kerf of the saw blade 24.

Obviously, many modifications may be made without departing from the basic spirit of the present invention; and accordingly, within the scope of the appended claim, the invention may be practiced other than has been specifically described.

We claim:

In a portable power-driven jig saw which is provided with a work-engaging shoe having a flat undersurface, wherein the shoe includes a pair of shoe members having respective inner edges parallel to each other and defining a rectangular blade opening therebetween, the blade opening having a given lateral width measured between said inner edges, an anti-splintering resiliently-retained molded plastic insert for the blade opening in the shoe, said insert comprising:

(a) a rear bridge portion;
(b) a pair of spaced parallel runners formed integrally with said bridge portion and extending forwardly therefrom;
(c) said runners having a central blade slot formed therebetween;
(d) said bridge portion having respective side edges each of which has a convex arcuately-shaped portion protruding laterally therefrom;
(e) means forming a pair of holes in said bridge portion, each of which holes is substantially concentric with a respective one of said convex portions;
(f) each of said runners having an outer edge provided with a slotted guideway, all of said edges and said guideways being parallel to each other, whereby said insert may be slidably received within the blade opening such that the shoe members are received within said respective slotted guideways, thereby restraining said insert against movement vertically with respect to the shoe;
(g) said bridge portion and said runners having a common flat undersurface which is co-planar with the flat undersurface of the shoe;
(h) said bridge portion of said insert having a lateral width, measured across said convex portions, which is greater than the given lateral width of the blade opening, whereby, when said insert is slidably received within the blade opening, said convex portions will be partially depressed inwardly of said insert, thereby creating a slight interference fit between the shoe members and said bridge portion of said insert, and whereby said bridge portion will thereafter tend to restore its original shape, thereby creating a spring-effect to resiliently retain said insert within the blade opening in the shoe; and
(i) said runners of said insert having a lateral width, measured across said slotted guideways, which is less than the given lateral width of the blade opening, whereby said insert may have a limited pivoting movement within the plane of the blade opening in the shoe.

References Cited in the file of this patent
UNITED STATES PATENTS

| | | |
|---|---|---|
| 2,644,475 | Morton | July 7, 1953 |
| 2,842,170 | Bruck et al. | July 8, 1958 |
| 2,996,089 | McCarty | Aug. 15, 1961 |